(12) United States Patent
Murray

(10) Patent No.: US 8,510,161 B2
(45) Date of Patent: Aug. 13, 2013

(54) RESERVATION GIFT CARD

(75) Inventor: Robert Murray, Maple Grove, MN (US)

(73) Assignee: Target Brands, Inc., Minneapolis, MN (US)

( * ) Notice: Subject to any disclaimer, the term of this patent is extended or adjusted under 35 U.S.C. 154(b) by 3062 days.

(21) Appl. No.: 10/838,149

(22) Filed: May 3, 2004

(65) Prior Publication Data

US 2005/0246230 A1 Nov. 3, 2005

(51) Int. Cl.
*G06Q 30/00* (2012.01)

(52) U.S. Cl.
USPC ......... 705/14.38; 705/14.1; 705/14.3; 705/41

(58) Field of Classification Search
USPC ................ 705/14.1, 14.3, 14.38, 41
See application file for complete search history.

(56) References Cited

U.S. PATENT DOCUMENTS

| | | | |
|---|---|---|---|
| 4,797,542 A * | 1/1989 | Hara | 235/380 |
| 5,406,068 A | 4/1995 | Nusbaum | |
| 5,442,567 A * | 8/1995 | Small | 700/237 |
| 5,918,909 A * | 7/1999 | Fiala et al. | 283/61 |
| 5,987,420 A * | 11/1999 | Maeda et al. | 705/5 |
| 6,050,493 A * | 4/2000 | Fertig | 235/487 |
| 6,260,024 B1 * | 7/2001 | Shkedy | 705/37 |
| 6,295,522 B1 * | 9/2001 | Boesch | 705/41 |
| 6,330,544 B1 * | 12/2001 | Walker et al. | 705/14 |
| 6,467,684 B2 | 10/2002 | Fite et al. | |
| 6,527,192 B1 | 3/2003 | Altschul et al. | |
| 6,690,794 B1 * | 2/2004 | Terao et al. | 380/22 |
| 6,728,685 B1 * | 4/2004 | Ahluwalia | 705/26.5 |
| 6,842,741 B1 * | 1/2005 | Fujimura | 705/59 |
| 6,999,936 B2 * | 2/2006 | Sehr | 705/5 |
| 7,022,017 B1 * | 4/2006 | Halbritter et al. | 463/42 |
| 7,136,822 B2 * | 11/2006 | Kimura et al. | 705/5 |
| 7,236,946 B2 * | 6/2007 | Bates et al. | 705/26 |
| 7,328,166 B1 * | 2/2008 | Geoghegan et al. | 705/5 |
| 2002/0042742 A1 | 4/2002 | Glover et al. | |
| 2002/0060246 A1 * | 5/2002 | Gobburu et al. | 235/462.46 |
| 2002/0069093 A1 * | 6/2002 | Stanfield | 705/5 |
| 2002/0116235 A1 * | 8/2002 | Grimm et al. | 705/5 |
| 2002/0157974 A1 * | 10/2002 | Krahn | 206/308.1 |
| 2002/0178034 A1 * | 11/2002 | Gardner et al. | 705/5 |
| 2002/0194135 A1 * | 12/2002 | Taylor et al. | 705/64 |
| 2003/0110138 A1 | 6/2003 | Van Do et al. | |
| 2004/0039637 A1 * | 2/2004 | Kopf et al. | 705/14 |
| 2004/0089714 A1 * | 5/2004 | Raadsen | 235/380 |
| 2004/0118914 A1 * | 6/2004 | Smith et al. | 235/380 |
| 2004/0167821 A1 * | 8/2004 | Baumgartner | 705/17 |
| 2005/0038714 A1 * | 2/2005 | Bonet et al. | 705/26 |
| 2005/0182720 A1 * | 8/2005 | Willard et al. | 705/40 |
| 2006/0207856 A1 * | 9/2006 | Dean et al. | 194/302 |
| 2007/0016533 A1 * | 1/2007 | Fujimura | 705/65 |
| 2007/0260495 A1 * | 11/2007 | Mace et al. | 705/5 |

* cited by examiner

*Primary Examiner* — John Van Bramer
(74) *Attorney, Agent, or Firm* — Griffiths & Seaton PLLC; JoAnn M. Seaton

(57) ABSTRACT

A method of using a stored-value card to reserve an item includes providing a stored-value card to a customer prior to the release date of an item, adding value to the stored-value card prior to the release date of the item, and reserving the item with the stored-value card. Other method and product embodiments are disclosed.

24 Claims, 4 Drawing Sheets

RESERVATION GIFT CARD

BACKGROUND OF THE INVENTION

Some merchant areas, e.g. video games and books, are at distinct disadvantage competitively in the marketplace when it comes to pre-selling new releases. Current pre-sale methods using pre-loaded and/or pre-specified dollar-amount coupons, normally stored in a drawer or under lock-and-key at an electronics counter or other location in a retail store, result in shortage and accounting reconciliation issues. Also, because such coupons are pre-loaded and kept behind display glass or elsewhere, merchandising options are limited.

Stored-value cards and other financial-transaction cards come in many forms. A gift card, for example, is a type of stored-value card that includes pre-loaded or selectably loaded monetary value. In one example, a customer buys a gift card having a specified value for presentation as a gift to another person. In another example, a customer is offered a gift card as an incentive to make a purchase. A gift card, like other stored-value cards, can be "recharged" or "reloaded" at the direction of the bearer. The balance associated with the card declines as the card is used, encouraging repeat visits to the retailer or other provider issuing the card. Additionally, the card generally remains in the user's purse or wallet, serving as an advertisement or reminder to revisit the associated retailer. Gift cards provide a number of advantages, to both the customer and the retailer.

SUMMARY OF THE INVENTION

A method of using a stored-value card to reserve an item includes providing a stored-value card to a customer prior to the release date of an item, adding value to the stored-value card prior to the release date of the item, and reserving the item with the stored-value card. Other method and product embodiments are disclosed.

BRIEF DESCRIPTION OF THE DRAWINGS

Embodiments of the invention will be described with respect to the figures, in which like reference numerals denote like elements, and in which.

DETAILED DESCRIPTION

Embodiments of the invention relate to a gift card or other stored-value card that is used not only in the manner of a typical gift card, but also to reserve an in-demand item prior to a date or time when the item becomes generally available. For example, embodiments of the invention are used to reserve a copy of a book, prior to the release date of that book. Embodiments of the invention are particularly, though not exclusively, advantageous when pre-release demand for the item is extraordinary and the release date is a long-awaited event. Items that are reservable according to embodiments of the invention include not just books, but other merchandise, such as video games, videos, music, CD's, and DVD's, to name several non-exclusive examples. Reservable items according to embodiments of the invention also include services that are not scheduled to be available until a certain date or time.

Figure 1:
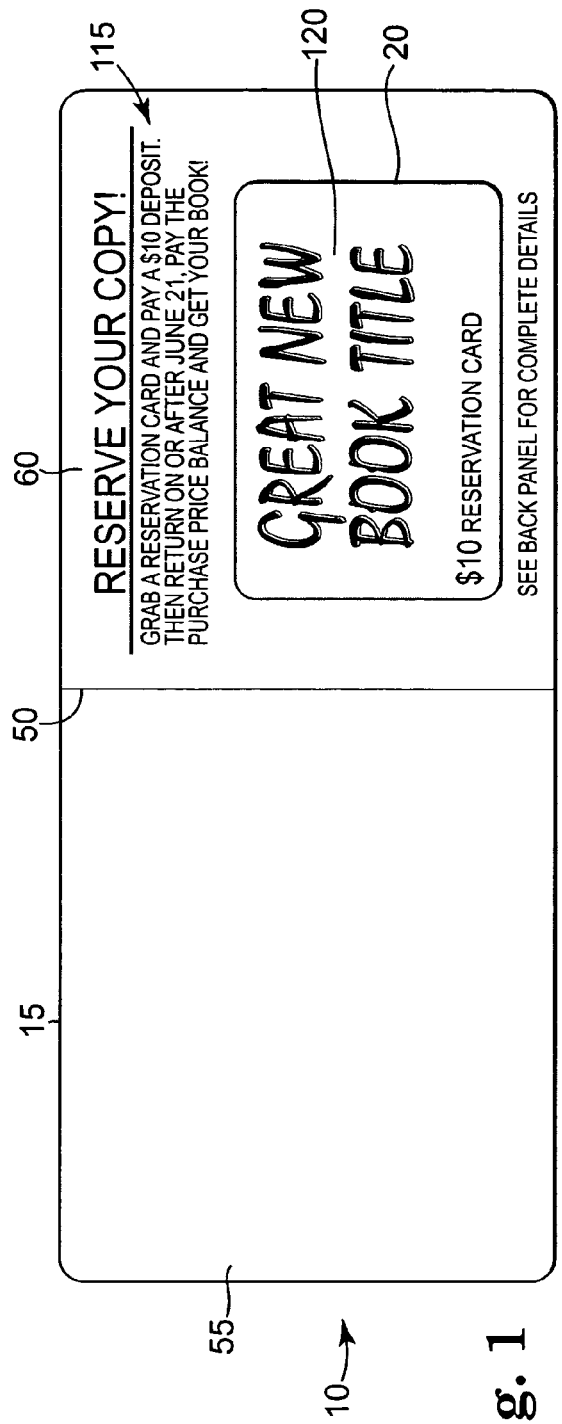
FIG. 1 is a front view of a gift card assembly, according to an embodiment of the invention.
Figure 2:
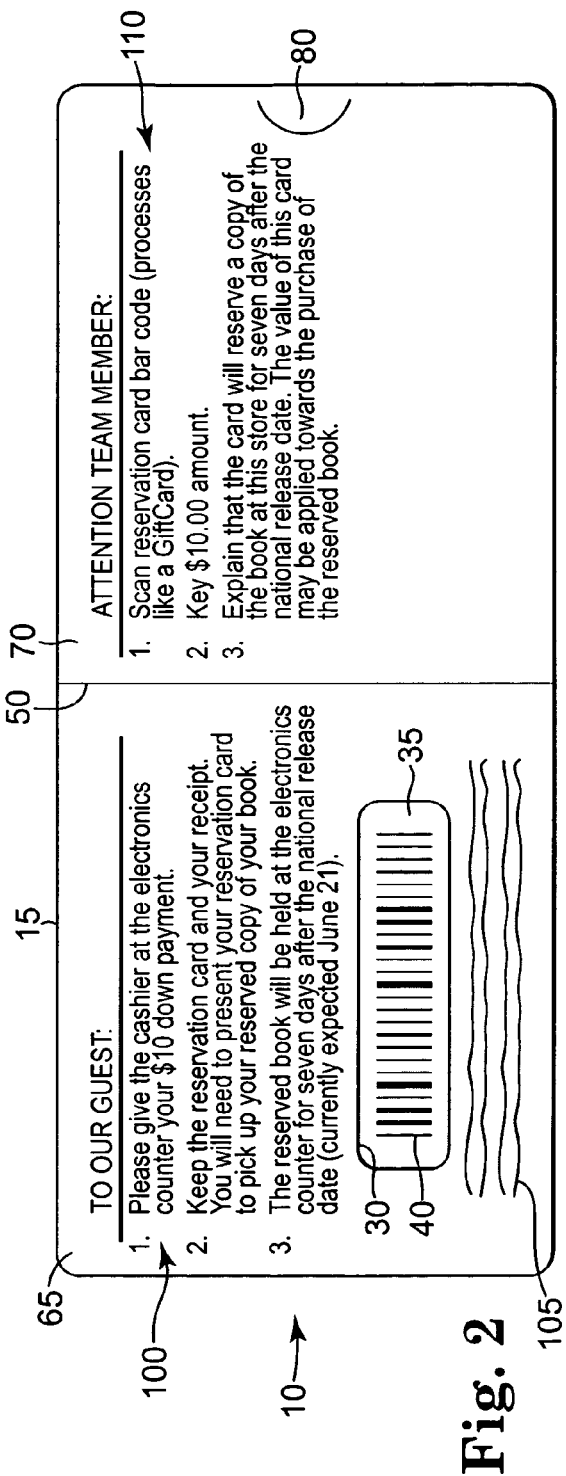
FIG. 2 is a rear view of the FIG. 1 assembly.

Referring to FIGS. 1-2, stored-value card assembly 10 includes substrate 15. Substrate 15, which also may be called a backing, comprises a single layer or multiple layers of paper or plastic material, for example, generally in the form of a relatively stiff but bendable/flexible card. Other materials are also contemplated.

Substrate 15 supports stored-value card or other financial-transaction card 20. Card 20 is releasably secured to substrate 15 by adhesive or an adherence layer. Card 20 is, for example, a card used by a merchant to issue a spending credit to a customer. The merchant provides the card in exchange for money received, merchandise returned or other consideration. The card is "loadable" with monetary value, for example a dollar value that the merchant's customer can use or give to another individual. A record of the monetary balance on the card optionally is maintained on a database, other electronic or manual record-keeping system, or, in the case of "smart" cards, for example, on a chip or other electronics or devices on the card itself.

Substrate 15 defines window or opening 30 for displaying activation area 35 of card 20. According to the illustrated embodiment, activation area 35 includes bar code 40. Alternatively, or additionally, activation area 35 may include a magnetic strip, a smart chip or other electronic device, a radio frequency identification device, or other identification device or indicia, such as a card number and event number. Bar code 40 or other activation-area feature optionally represents an account number or otherwise serves to link card 20 to a database or other electronic or manual storage device or system. In the case of a stored-value card, activation area 35 is adapted for loading of the stored-value card with monetary value.

Substrate 15 is a bi-fold substrate defining fold line 50, about which substrate 15 is foldable roughly in half. In FIGS. 1-2, substrate 15 is unfolded, i.e. is in an open configuration. According to one embodiment, FIG. 1 illustrates surfaces 55, 60 of substrate 15 that will be on the outside of assembly 10 when substrate 15 is folded about fold line 50, and FIG. 2 illustrates surfaces 65, 70 of substrate 15 that will be on the inside of assembly 10 when substrate 15 is folded about fold line 50. Folding substrate 15 in the manner described yields a folded substrate 15, i.e. a substrate 15 in a closed configuration, with card 20 supported on front outer surface 60 thereof. According to one embodiment, the length of surfaces 70, 55 is slightly greater than the length of surfaces 60, 65, such that a slight underlap area at the right-hand side (as viewed in FIG. 2) of surface 70 is defined when substrate 15 is folded about fold line 50. Substrate 15 also defines a cut, forming flap 80. If desired, the right-hand edge (as viewed in FIG. 1) of surface 60 may be tucked behind flap 80 to hold assembly 10 in the closed configuration.

Folded substrate 15 and card 20 together define a compact package. The package, e.g. one or both of substrate 15 and card 20, displays graphics or text information, e.g. brand indicia, advertising, promotional information, directions, or other information. For example, as illustrated on inside surface 65 of substrate 15, indicia 100 (alone or in combination with other indicia on card 20) directs a purchaser of stored-value or gift card 20 to give a store employee, at a location within a retail store, a down payment to reserve a pre-release item. Alternatively, indicia 100 directs the purchaser to make a down payment in a different way, e.g. at an in-store or other kiosk, over the Internet, or in some other manner. Indicia 100 also directs the purchaser to keep card 20, and a receipt, and to present card 20 to pick up a reserved copy of the pre-release item, which is identified by title, for example. Indicia 100 also indicates that the reserved pre-release item will be held at a location within the retail store for a predetermined period of time, e.g. seven days, after a release date, e.g. the national release date, for the pre-release item. The national release date may be specifically identified by day, month and year.

Surface 65 includes additional indicia 105, which optionally indicates one or more of the following: that card 20 is redeemable toward the price of the reserved item, that card 20 is redeemable only at the specific retail store location where purchased, that the reserved item will be held for a predetermined period of time, e.g. seven days, after the release date of the item, that after the predetermined period of time, the retail store will not be responsible for holding the reserved item, that if a reserved item is unavailable then card 20 may be used for other items (e.g. merchandise or services) at the retail store, at another retail store in a common chain of retail stores, at an Internet site, etc., that card 20 is not redeemable for cash or credit except where required by law, that a lost, damaged or stolen card can be reported by telephone so that the retail store can replace the remaining value upon presentation of the original purchase receipt, and that card 20 has no value until purchased, i.e. until a down payment on the reserved item is made.

Surface 70 of substrate 15 includes indicia 110, which optionally are directed to a store employee and optionally indicate one or more of the following: that the employee should scan bar code 40, that card 20 then processes in the store's computer or POS system like a normal gift card, that a down payment amount, for example $10.00, should be keyed in to the computer or POS system, that it should be explained to the purchaser that card 20 will reserve a copy of the pre-release item, such as a book, at that particular retail store location for a predetermined period of time after the national release date, and that the value of card 20 may be applied towards the purchase of the reserved book.

Front surface 60 of substrate 15 includes indicia 1115, which optionally indicate one or more of the following: an encouragement to the purchaser to reserve a pre-release item, e.g. "Reserve Your Copy!", that card 20 may be obtained, a deposit paid, and then card 20 returned on or after a certain date, e.g. a national release date for the pre-release item, and that the purchase price balance then may be paid for the purchaser to receive their pre-release item. Card 20 itself optionally includes indicia 120 indicating the title of a book, video game, or other pre-release item, and/or additional text or graphics, including promotional material, advertising, brand identifiers, or the like.

Any of indicia 100, 105, 110, 115, 120, or other indicia, optionally may appear anywhere on substrate 15 and/or card 20. Additional information besides that specifically described and illustrated herein also may be included. For example, such indicia optionally appear on a back surface of card 20, a portion of which is visible through opening 30 in FIG. 2. According to one embodiment, indicia appearing on the back of card 20 are generally identical to indicia 105 on surface 65 of substrate 15.

According to embodiments of the invention, then, assembly 10 is an example of a reservation stored-value card assembly including a reservation stored-value card 20 defining means for loading the reservation stored-value card with monetary value, e.g. bar code 40 or other indicia or apparatus tied to a database or other record-keeping system, a smart chip, etc., and means for directing a purchaser of card 20 to make a down payment to reserve a pre-release item and to present card 20 to pick up the reserved item.

Figure 3:
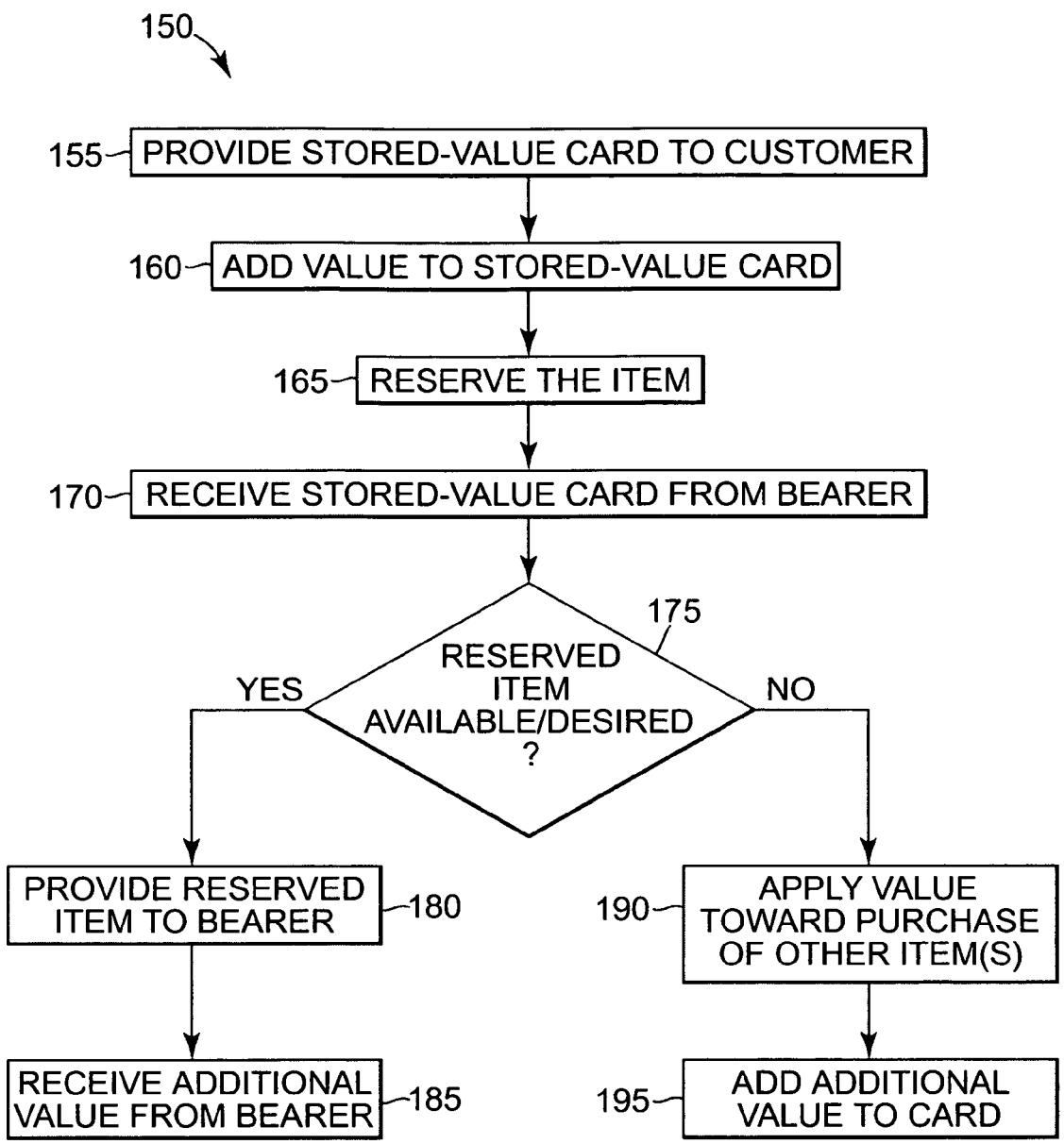
FIG. 3 is a flow chart showing a method according to an embodiment of the invention.
Figure 4:
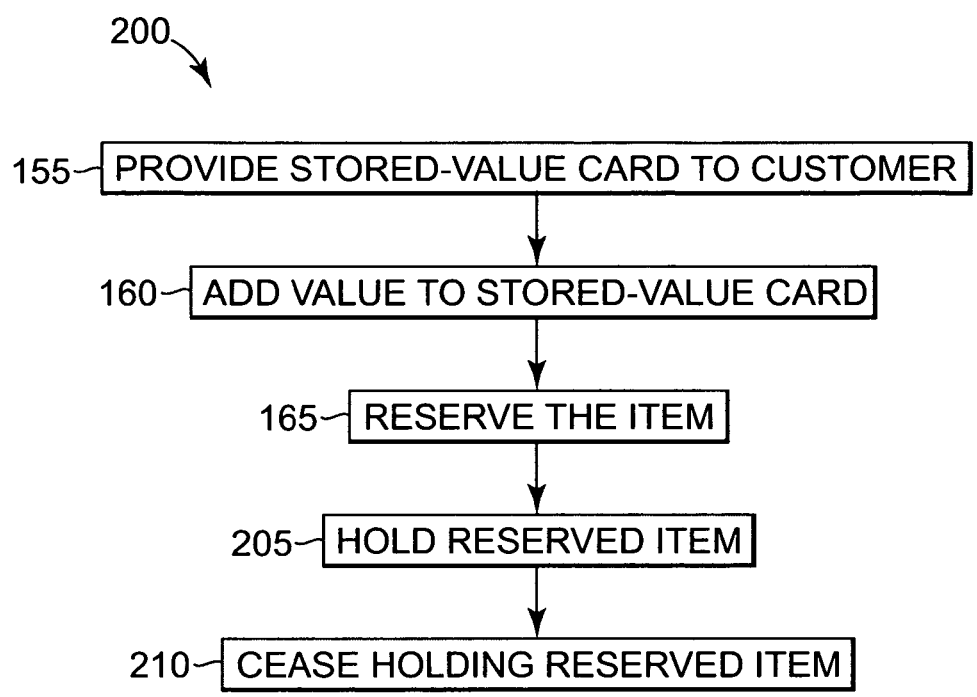
FIG. 4 is a flow chart showing a method according to an embodiment of the invention.
Figure 5:
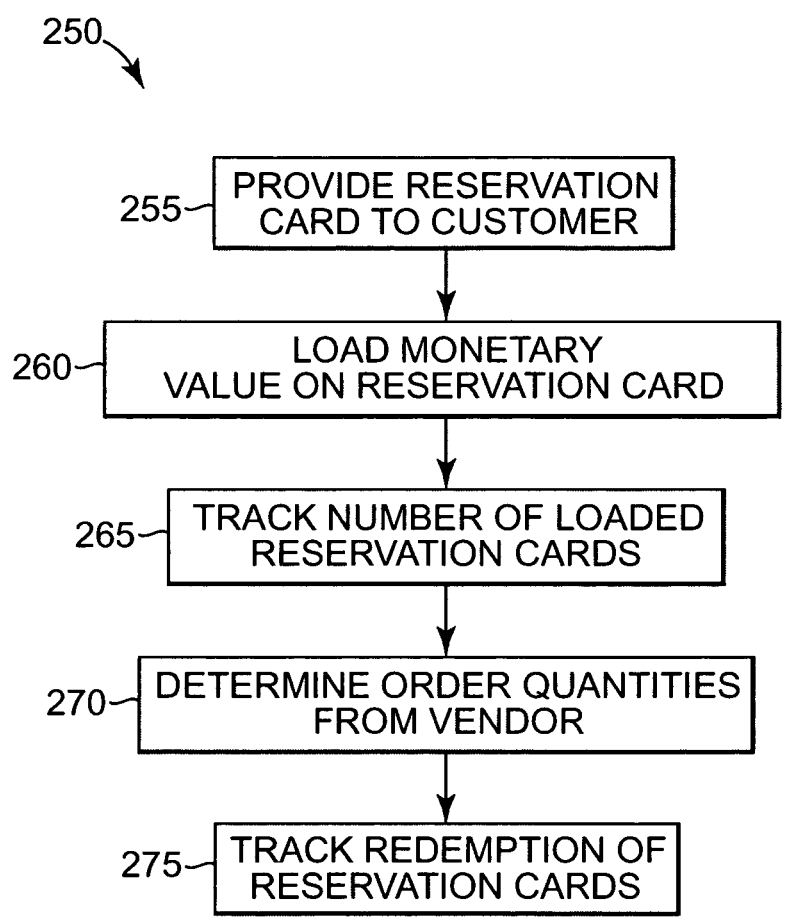
FIG. 5 is a flow chart showing a method according to an embodiment of the invention.

Method embodiments according to the invention are illustrated in FIGS. 3-5. FIG. 3 shows method 150 of using a stored-value card to reserve an item, the method comprising providing, at 155, a stored-value card to a customer, e.g. a customer shopping at a retail store, prior to the release date of an item. Providing 155 optionally includes displaying the stored-value card to multiple customers, e.g. supporting multiple stored-value cards simultaneously on a display in an area of a retail store that is open to the public. Providing 155 optionally includes providing a stored-value card 20 having zero initial value. Because such cards 20 have no value until purchased or "loaded", according to embodiments of the invention, cards 20 are not limited to being kept under lock-and-key behind display glass or elsewhere. Merchandising options are expanded to include open displays and other free-access modes. Providing 155 also optionally includes releasably affixing card 20 to substrate 15, for example with adhesive or an adhering layer.

Method 150 also includes adding value, at 160, to stored-value card 20, prior to the release date of the item. Adding 160 optionally includes presenting card 20 to an employee of a retail store, for example a cashier at a department counter or at the general checkout lanes. Adding 160 also optionally includes updating a record of a monetary balance for card 20 in an electronic database, maintained e.g. at the store, at a central headquarters for a chain of stores or at another centralized or remote location. Adding 160 also optionally includes activating card 20, and/or adding a deposit that is less than a full purchase price for the item. Method 150 also includes, at 165, reserving the item for the customer (or the customer's designee, if the customer wishes to give card 20 to another party, for example).

Method 150 additionally includes receiving, at 170, card 20 from a bearer of card 20. Receiving 170 occurs on or after the release date of the item, e.g. on or after the national release date of a book or other item of merchandise. Receiving 170 occurs at the retail store where card 20 was originally purchased, according to embodiments of the invention. It is also possible that receiving 170 occurs at a different location. A store employee or other individual receives card 20; receiving 170 also optionally occurs without direct human intervention, e.g. at a kiosk in a retail store or over the Internet on the store's website, for example. Providing 155 also optionally occurs in this manner.

If the reserved item is available and still desired by the customer, as indicated at 175, method 150 also optionally includes, at 180, providing the reserved item to the bearer of card 20. In the case where the value originally added to card 20 at 160 is a down payment, i.e. only a portion of the purchase price of the item, for example, method 150 also includes receiving, at 185, additional value from the bearer—the difference between the down payment and the full purchase price, for example. In the case where the value originally added to card 20 at 160 is sufficient to cover the purchase price of the item, then receiving 180 need not occur.

If the reserved item is unavailable and/or not desired by the customer, as indicated at 175, method 150 also optionally includes, at 190, applying the value originally added to the card at e.g. 160 for purchase of one or more items other than the reserved item. For example, as indicated by indicia 105 in the above-described embodiment, the reserved item might not be held by the retail store longer than a predetermined period after the release date, e.g. a week after the release date, and might therefore be unavailable as a reserved item. Alternatively, the purchaser of card 20 might change their mind and no longer desire the reserved item, or the bearer of card 20 might not want the reserved item. In such cases, card 20 is useable as a typical gift card or stored-value card, where the value stored on card 20 is used to purchase other items at the retail store. Card 20 also can be recharged, reloaded, and otherwise used as a typical gift card. Method 150 thus optionally includes adding, at 195, additional value to card 20 for purchase of one or more items other than the reserved item.

FIG. 4 illustrates an additional method 200 according to an embodiment of the invention. Method 200 includes providing 155, adding 160 and reserving 165 as described previously. Method 200 also includes, at 205, holding the reserved item for the customer or the customer's designee for a predetermined period of time after the release date of the item. Method 200 also includes, at 210, ceasing to hold the reserved item after the predetermined period of time. In the case of high customer demand, for example, it may desirable to open up all reserved copies for purchase by others, after a certain period of time elapses. Ceasing 210 optionally includes reducing the value loaded on card 20 if the predetermined period of time elapses without the reserved item being picked up or purchased, e.g. in the manner of administrative charge. On the other hand, it may be more advantageous to the retail store if the customer is assured that there will be no value lost if the item is not picked up or purchased within the predetermined period of time, and, indeed, that the customer can apply the down payment amount to any other item of merchandise or service offered by the retail store.

Embodiments of the invention also provide advantages for the retail store offering the new release. In addition to encouraging not only sales of the pre-release item but also other merchandise and services offered by the store, embodiments of the invention allow the store to more easily track pre-sales, redemption rates, vendor-order quantities, and other information.

In that regard, FIG. 5 illustrates method 250 according to an embodiment of the invention. Method 250 includes, at 255, providing reservation card 20 to a customer prior to a release date of a new release. Providing 255 optionally includes providing a zero-initial-value reservation card to the customer, e.g. a card that is not pre-loaded with any value but instead needs to be loaded or activated in connection with receipt of payment by the customer. Accordingly, providing 255 also optionally includes displaying the reservation card in a retail store with unrestricted access to the card by multiple customers. Method 250 also includes, at 260, having the customer load monetary value on card 20 toward purchase of the new release, e.g. having the customer direct that a certain monetary value be added to card 20. Method 250 also includes, at 265, tracking the number of reservation cards loaded with the monetary value, to track pre-sales of the new release. At 270, method 250 includes determining order quantities from a vendor of the new release in view of the tracked pre-sales. Instead of having to blindly estimate the number of items that will be sold, embodiments of the invention allow retailers to more accurately forecast how many of the items will be needed to meet customer demand. Method 250 also includes, at 275, tracking redemption of the reservation cards, e.g. tracking how many cards are redeemed and applied toward purchase of the released item, how many cards are applied toward purchase of other items at the retailer, how many cards are reloaded, and/or how many cards are never redeemed.

Thus, embodiments of the invention enable merchants to track pre-sale of merchandise by store, by requiring the customer to put a specified monetary amount on reservation card 20 and then requiring that the customer bring the card back on the date/week of the product release to pick up their reserved/set aside product. This gift card platform tracks the number of reservation cards by store, so that the merchant knows how much quantity of the product to set aside on a per-store basis. Using this platform corrects shortage/theft and accounting-reconciliation issues and allows for more merchandising options. Because the reservation card is not pre-loaded, but only activated at a cashier's station or other location, theft of the reservation card is minimized. Further, as referenced earlier herein, because the reservation card is not pre-loaded, it can be sold out in the open instead of from behind the counter, allowing more marketing and merchandising options with the pre-sale offer. This technology platform then tracks sales and redemption information for the card. Depending on the number of reservation cards sold, the merchant knows "pre-sales" for the product and can determine order quantities accordingly with the vendor of the item. Reservation cards are tracked at redemption to know what percentage of the reservation cards were redeemed back in a specific department of the retail store, e.g. whether they were redeemed for the item that was pre-sold or used for another item or purpose.

Embodiments of the invention also extend to a method of making reservation gift card assembly 10, the method including providing substrate 15, supporting reservation gift card 20 on substrate 15, reservation gift card 20 defining activation area 35 adapted for loading of the reservation gift card with monetary value, and providing indicia 100, 105, 110, 115, and/or 120 on reservation gift card 20 and/or substrate 15 directing a purchaser of reservation gift card 20 to make a down payment to reserve a pre-release item and to present reservation gift card 20 to pick up the reserved item.

Stored-value cards come in many forms, according to embodiments of the invention. A gift card, for example, includes pre-loaded or selectably loaded monetary value. In one example, a customer provides consideration in the amount of the card value, or is offered the gift card as an incentive to make a purchase, and then either keeps the card for use or provides the card as a gift to a recipient. The gift card, like other stored-value cards, can be "recharged" or "reloaded" at the direction of the original customer, the gift recipient, or a third party. The balance associated with the card declines as the card is used, encouraging repeat visits. The card remains in the user's purse or wallet, serving as an advertisement or reminder to re-visit the associated merchant. Gift cards according to embodiments of the invention provide a number of advantages to both the customer and the merchant. Other stored-value cards according to embodiments of the invention include loyalty cards, merchandise return cards, electronic gift certificates, employee cards, frequency cards, pre-paid cards, and other types of cards associated with or representing purchasing power or monetary value, for example.

Although the invention has been described with respect to particular embodiments, such embodiments are for illustrative purposes only and should not be considered to limit the invention. Various alternatives and changes will be apparent to those of ordinary skill in the art. For example, card 20 optionally is a physical card made of plastic, paper, generally stiff paper, other substrate, or the like. Card 20 also optionally is a virtual or electronic card accessible on a retailer's website, other Internet location, kiosk, or elsewhere. Adding value to card 20 optionally includes adding either a fixed amount or an amount that can be chosen by the customer. The release date of an item optionally is its national release date, a local release date or release date within another geographic region, a release date within a particular store or group of stores, or otherwise a date or time when an item becomes generally available, and/or available in a less-restricted form than at a previous time. Other modifications within the scope of the invention in its various embodiments will be apparent to those of ordinary skill.

What is claimed is:

1. A method of supporting use of a stored-value card to reserve and purchase an item from a retail merchant, comprising:
   providing a stored-value card to a customer prior to a release date of an item, the stored-value card including an activation area linking the stored-value card to an account stored in a database, wherein the database is associated with a retail merchant;
   using a point-of-sale computer system to scan the activation area of the stored-value card, access the account stored in the database, and add a value to the stored-value card prior to the release date of the item to automatically secure the item for future purchase after the release date, wherein the value is at least equal to a predetermined minimum value for reserving the item, wherein the value is received from the customer;
   reserving the item using the stored-value card, including physically holding the item for purchase by a bearer of the stored-value card on or after the release date; and on or after the release date:
      receiving the stored-value card, which includes the value added thereto, from the bearer of the stored-value card via a store computer configured to read the activation area in exchange for physical delivery of the item to the bearer, and
      allowing the bearer to remove the item from premises associated with the retail merchant,
      wherein providing the stored-value card, using the point-of-sale computer system to scan the activation area, access the account, and add the value, reserving the item, receiving the stored-value card and allowing the bearer to remove the item are all performed by the retail merchant, and the store computer is located on the premises associated with the retail merchant.

2. The method of claim 1, further comprising displaying the stored-value card to multiple customers.

3. The method of claim 2, wherein the displaying includes supporting multiple stored-value cards simultaneously on a display in a retail store.

4. The method of claim 1, wherein the providing comprises releasably affixing the stored-value card to a substrate.

5. The method of claim 1, wherein using the point-of-sale computer system to add the value to the stored-value card comprises presenting the stored-value card to an employee of the retail merchant operating the point-of-sale computer system.

6. The method of claim 1, wherein using the point-of-sale computer system to add the value to the stored-value card comprises updating a monetary balance for the stored-value card indicated in the account stored in the database.

7. The method of claim 1, further comprising applying the value added to the stored-value card toward a purchase of an item other than the reserved item.

8. The method of claim 1, further comprising holding the reserved item for the customer or customer's designee for a predetermined period of time after the release date.

9. The method of claim 8, further comprising ceasing to hold the reserved item after the predetermined period of time.

10. The method of claim 9, wherein the ceasing to hold comprises reducing the value loaded on the stored-value card including updating the account stored in the database.

11. The method of claim 1, further comprising using one of the point-of-sale computer system and the store computer to add additional value to the stored-value card for purchase of one or more items other than the reserved item.

12. The method of claim 1, wherein the providing comprises providing to the customer the stored-value card having zero initial value.

13. The method of claim 12, wherein using the point-of-sale computer system to add the value to the stored value card comprises activating the stored-value card.

14. The method of claim 1, wherein using the point-of-sale computer system to add the value to the stored value card comprises adding a deposit that is less than a full purchase price for the item to the stored-value card.

15. The method of claim 1, further comprising providing a receipt to the customer for the added value.

16. The method of claim 1, wherein receiving the stored-value card in exchange for the item includes receiving additional monetary value from the bearer.

17. The method of claim 1, wherein the item is one of a book and a video game.

18. The method of claim 1, wherein the release date is an earliest date that the item is available to be transferred from the retail merchant to a customer such that the customer can take possession of the item and the item is able to be removed from the premises associated with the retail merchant by the customer.

19. The method of claim 1, wherein providing the stored-value card and using the point-of-sale computer system to add the value are both performed during a single transaction in which the item is secured for future purchase.

20. The method of claim 1, wherein the item is one of a book and a video game, physically holding the item for purchase begins prior to the release date, the release date is the earliest date that the retail merchant can sell the item and allow the item to be removed from the premises associated with the retail merchant, receiving the stored-value card in exchange for the item includes receiving additional monetary value from the bearer, and the method further comprises:
   tracking pre-sales of the item by tracking a number of the stored-value cards used to reserve the item, wherein tracking is performed by a technology platform including the point-of-sale terminal, the store computer, and the database;
   determining order quantities from a vendor of the item in view of the tracked pre-sales; and
   ordering the item in the determined order quantities for delivery to the retail merchant prior to the release date.

21. The method of claim 20, further comprising:
   displaying the stored-value card in a retail store on the premises associated with the retail merchant such that the stored-value card is readily accessible by multiple consumers prior to adding the value to the stored-value card.

22. The method of claim 20, further comprising:
   tracking the number of stored-value cards used to purchase the item after the release date of the item.

23. A method of making and supporting use of a reservation gift card assembly, comprising:
   providing a substrate;
   supporting a reservation gift card on the substrate, the reservation gift card defining an activation area linking the reservation gift card to a record of any monetary value associated with the reservation gift card, the activation area being one of a bar code and a magnetic strip;
   providing indicia on the reservation gift card and/or the substrate directing a purchaser of the reservation gift card to make a down payment to reserve a pre-release item and to present the reservation gift card to pick up the reserved pre-release item;

maintaining the record in a database separate from the reservation gift card;

increasing the monetary value associated with the reservation gift card by adding the down payment thereto on a first date using one of a plurality of store computers to increase the monetary value in the record, wherein each of the store computers is configured to scan the activation area to determine the record, and each of the store computers is in communication with the database such that each of the store computers can access records stored in the database;

accepting, using one of the plurality of store computers, the reservation gift card and applying the down payment toward a purchase price of the pre-release item on or after a second date, which is different than and subsequent to the first date, wherein the reserved pre-release item is available for pick up only on or after the second date; and providing the reserved item to a bearer of the reservation gift card following applying the down payment toward the purchase price.

24. The method of claim 23, further comprising adding, using one of the store computers, monetary value to the reservation gift card in excess of the down payment for purchase of one or more items other than the pre-release item.

* * * * *